United States Patent [19]

Klaschka

[11] Patent Number: 4,580,328

[45] Date of Patent: Apr. 8, 1986

[54] METHOD OF CLOSING A CAN-TYPE HOUSING

[76] Inventor: Rudolf Klaschka, Tannenweg 9, 7896 Wutöschingen, Fed. Rep. of Germany

[21] Appl. No.: 555,039

[22] Filed: Nov. 23, 1983

[51] Int. Cl.⁴ .................. B21D 39/00; B23P 11/00
[52] U.S. Cl. ........................... 29/510; 29/511; 29/25.41; 29/520; 29/243.52
[58] Field of Search .............. 29/511, 510, 25.41, 29/520, 243.52

[56] References Cited

U.S. PATENT DOCUMENTS

| 2,604,258 | 7/1952 | Murnane et al. | 29/511 X |
| 3,099,069 | 7/1963 | Pugh et al. | 29/511 X |
| 3,221,403 | 12/1965 | Simonton | 29/511 |
| 4,114,244 | 9/1978 | Klaschka | 29/511 X |

FOREIGN PATENT DOCUMENTS

841180 7/1960 United Kingdom .......... 29/511

*Primary Examiner*—Charlie T. Moon
*Attorney, Agent, or Firm*—Webb, Burden, Robinson & Webb

[57] ABSTRACT

The invention relates to a can-type housing made of metal, as a semi-finished product, such as is used, for example, for electrolytic capacitors. Furthermore, the invention relates to a process and a device for reducing the diameter of and flanging such a can-type housing. In the conventional way, the diameter of a can-type housing of this type was reduced from below in the direction of the upper open can edge. As a rule, flanging is carried out by a separate device. The invention improves the conventional measures by rewidening under dry conditions the can-type housing pre-widened under wet conditions. According to the process, the can-type housing provided with the housing widening is then closed from the can edge axially downwards so as to reduce its diameter, this process step being supplemented, in addition, by a further flanging step carried out in the same device. The reduction in diameter and the flanging are effected as a result of a relative axial displacement taking place in the same direction between the can and the device.

3 Claims, 6 Drawing Figures

METHOD OF CLOSING A CAN-TYPE HOUSING

DESCRIPTION

Background

The invention relates to a can-type housing, to a process for closing a can-type housing and to a device for reducing the diameter of and flanging a can-type housing provided with a housing widening.

Can-type housings of the type mentioned above are used predominantly in the electrical engineering industry in the form of encased capacitors having wisely varying dimensions and capacitances. The sector of batteries, for instance electrolyte or dry batteries in this case, may be mentioned as an example of a further field of use.

The can-type housings usually have a cylindrical or coaxial design. Variations from this, for example with an elliptic cross-section, are also possible within the scope of the invention.

With these can-type housings, especially in encased capacitors based on these, there is the problem that though being mass-produced articles they must nevertheless satisfy the most stringent safety regulations. On the one hand, this means that they are produced in the most favorable way in terms of cost and consequently virtually exclusively in fully automatic production processes. However, this also means, on the other hand, that the corresponding encased capacitors must be operational at high external and internal temperatures and must satisfy the safety provisions. As regards the safety factors, it is necessary, for example, to ensure that the encased capacitors guarantee, even under high internal excess pressures, that their closing bodies are fixed in a sufficiently reliable manner in the enclosing can edge. Of course, the safety aspect should not be at the expense of a higher reject rate in these elements.

Precisely where the automated production process is concerned, the problem arose, in known can-type housings made of metal and with a housing widening in the upper region, that because two or more can-type housings were pushed into one another in the manner of a stack the automatic feeding of the individual can-type housings in the correct position to the processing stations was not guaranteed with sufficient reliability. Because the lower regions of the can-type housings, which had a smaller outside diameter than the inside diameter of the upper housing widening, were inserted into one another, it was constantly necessary to intervene manually, thus causing interruptions in the automatic feed.

The housing widening in the upper region of the can-type housing is a prerequisite for easy insertion of the actual electrical component into the can interior and, in a similar way, simplifies the insertion of the closing body or closing plug which is usually elastic. The housing widening is produced in a so-called wet process with the use of appropriate lubricants, in a similar to deep-drawing processes. This wet process serves the purpose of keeping frictional forces between the can-type housing and the widening ram as low as possible, and this also applies to the resulting material distortions.

Consequently, if a cylindrical can-type housing were to be used as a starting product in the automatic production of, for example, encased capacitors, it would be necessary to allow for the wet-widening step as a preparatory step in capacitor production. However, since wet-widening necessarily requires subsequent cleaning and drying of the can-type housing precisely when electrical components are used, this would mean additional cleaning and drying stations with an enormous amount of time being required in mass-production, and this is rejected by capacitor or battery manufacturers for reasons of cost. Instead, the widening step should be transferred to the supplier of widened can-type housings. However, precisely in this last-mentioned case, it is then necessary, in the automatic feeding of widened can-type housings, to allow for the insertion of can-type housings into one another and for the interruptions or manual interventions necessitated as a result.

In previous processes for closing can-type housings of this type, into which, for example, the electrical component and an elastic closing plug were inserted, the can-type housing was pushed through a die in the direction of the can region of smaller diameter. At the same time, the diameter of the housing widening was reduced. However, the direction of movement of the can-type housing through the die caused distortion or compression of the material in the elastic closing plug, which was equivalent to a conical tapering of the closing plug with a slip component of the closing plug in the direction of the flanged edge.

To level out these force components and to guarantee a secure fit of the closing plug in the upper part of the can, beads projecting radially inwards were provided subsequently or at the same time as the reduction in diameter, and these caused a compression of the material of the corresponding closing body. Since conventionally a transition from the inner connecting wires to the outer connecting wires was made precisely as a result of the axial extent of the closing body, and this had to be resistant to gas and permeation, the useful life of the corresponding connecting or soldered joints was severely impaired as a result of the compression of material in the closing body. Sometimes, electrical conductivity was no longer ensured, even after a short time, because of a kind of kink stress at the soldered joints.

The inward flanging of the upper can edge towards the closing body normally had to be carried out in a separate process step which also involved a separate device. To avoid this, can-type housings, the upper edge of which was crimped over inwards, were sometimes used. However, the latter solution usually resulted in relatively poor axial fixing of the closing body.

Starting from the problems mentioned above, the object on which the invention is based is to provide a can-type housing and a process and device for closing and flanging it, the can-type housing being suitable for an automated production process, but its procedure also offering the greatest possible reliability as regards closing, without the formation of beads and the associated effect of shear forces in the region of the closing body, and wherein the device should be designed for combined closing and flanging of the can-type housing, while taking care of the material.

SUMMARY OF THE INVENTION

The fundamental idea of the invention as regards a can-type housing is that the housing widening effected by a wet process should be carried out at an early stage at the supplier's works. However, this initial housing widening is kept slightly less than the full widening which is necessary for the automatic production process for, for example, encased capacitors. The initial housing widening is therefore, for example, 0.2 mm or 1 mm less than the desired widening, depending on the size of the diameter of the can-type housing. At the same time, the inside diameter of the initial housing widening is deliberately kept somewhat less than the outside diameter of the bottom part located on the same side as the closure.

In this way, the stacking of can-type housings in housing widenings is avoided, as a result of which automatic feeding of the can-type housings to the production line, for example by means of a vibrating drum, can be achieved. Rewidening to obtain the secondary housing widening can then be integrated in an automatic production line under dry conditions as a preliminary step in the production process. Dry-widening is usually carried out only to an extent of fractions of millimeters, so that cleaning and drying for use with electrical components can, in this case, be omitted in the subsequent stages.

Within the scope of the process, the basic idea of the invention is to adopt precisely the opposite method of reducing the diameter and to carry out a reduction in diameter by exerting force components directed radially inwards and axially relative to the can bottom. This means that the reduction in diameter is effected by means of a bevel from the can edge axially downwards. In a different way from conventional closing processes, in the invention the closing body acquires a force and clamping direction which is axially inwards. At the same time, general displacement axially inwards can be prevented, for example, by a supporting bead. It is essential, however, that higher internal pressures can be compensated, without the need for the retaining beads which otherwise extend radially inwards into the closing body for the purpose of compressing the material. Consequently, the radial compression of the closing body according to the invention extends uniformly over the entire axial extent of the closing body, as a result of which shear or kink stresses in the lead wires and in their connections are avoided.

In terms of the device which is used, the essential idea of the invention is based on the fact that the reduction in diameter and the flanging can be carried out in phases separate from one another in time, but in a single tool which can also perform ejector functions. Merely as a result of relative axial displacement of the can in relation to the tool, the can wall of the housing widening is first slightly bent radially inwards on a sloping surface which deflects radially inwards. The persistent relative axial displacement essentially stresses the bending point, shifting axially downwards, of the housing widening in relation to the sloping surface. After the axial displacement distance for reducing the diameter of the housing widening has been passed, the upper can edge engages with a bending region. This bending region has a pronounced curvature extending approximately over the extent of a quadrant. The relative axial displacement which continues between the can-type housing and the tool results, at the uppermost tip of the can edge, in a bend shape which, because of the rigidity of the material is preserved even after leaving the bending region. The relative axial displacement which continues to occur takes place until the originally uppermost tip of the can edge engages in the desired way in an axially downward direction with the normally elastic closing body.

The advantage of a rimmed can according to the invention is, therefore, that it is delivered to the final producer as a prefabricated semi-finished product which has undergone a wet-widening process. Because of the relationship in diameter between the initial housing widening and the bottom of the rimmed can located on the same side as the closure, it is especially suitable for automatic feeding in the correct position to the production stations. The slight differential diameter which exists between the desired diameter which is the most effective for production purposes and the diameter of the initial housing widening when the can is supplied, can consequently be widened by means of dry rewidening. This dry rewidening, by means of which, for example, an increase in diameter by 0.2 mm is effected, can advantageously be carried out by means of an upper ram which appropriately consists of a relatively hard plastic. Since the can-type housing usually consists of aluminum or an aluminum alloy, the hardness of the plastic ram is sufficient for dry rewidening. In addition, when a plastic ram is used, the frictional forces arising during rewidening can be reduced considerably in comparison with a metal or steel ram. This in turn also contributes to the precision of the upper secondary housing widening, as required for the subsequent machining stage.

The process for closing the can-type housing is advantageously carried out from the upper can edge axially downwards towards the closing bottom of the can-type housing. This initially involves only a reduction in diameter of the secondary housing widening and not the flanging of the can edge. To prevent high axial material stresses, the processes for reducing the diameter of the housing widening and for flanging the can edge are separated in time. This is advantageously achieved by carrying out, in principle, two-process steps succeeding one another in time, in spite of a continuous axial displacement of the can-type housing in relation to a die. In view of the relative axial displacement of the can-type housing and the appropriate tool relative to one another, the reduction in diameter is carried out on a frustoconical reducing surface. This reducing surface opens outwards, so that the can edge rewidened to the desired diameter first engages with it. The can edge is therefore first beveled according to the angle of inclination of the frustoconical reducing surface and, as a result of the progressive axial displacement, is reduced to the necessary outside diameter at the smallest inner frustum radius of the reducing surface. The advantage of the frustoconical reducing surface is that, even when there are tolerance differences in the diameter of the housing widening, the latter engages with the reducing surface and is reduced to the desired diameter at the end of the reducing surface. Advantageously the housing widening is reduced to the diameter of the lower unwidened region of the can, so that essentially a cylindrical shell surface of the can is obtained. As a result, handling for later processing stages, for example automatic insertion of printed-circuit boards, is simplified substantially. On the other hand, identical stress characteristics are achieved over the entire cylindrical surface of the can housing.

According to the invention, the reduction in diameter and flanging of the can edge can be achieved in a single process step, the can preferably being held stationary and axial displacement of the appropriate tool taking place. This offers the advantage that the can-holding die can be simplified considerably and that, finally, the guidance of the can remains in a single conveying plane.

The fundamental idea of a device for reducing the diameter of and flanging a can-type housing made of metal and provided with a housing widening is to provide, as a first engagement with the upper can edge of the can-type housing, a sloping surface which merges into a cylindrical inner shell surface. The diameter of the inner cylindrical surface corresponds relatively closely to the desired diameter of the can-type housing of reduced diameter. This inner cylindrical surface has a radially adjoining flanging region which has, in axial section, a wedge-shaped bending surface preferably in the form of a partial arc. This flanging region is advantageously offset an axial distance inwards. This axial distance between the inner edge of the diameter-reducing sloping surface and the start of the flanging region is calculated so as to correspond at least to the axial extent of the housing widening. This axial offset of the flanging region relative to the sloping surface ensures that, with a progressive relative axial displacement of the widened can housing in relation to the device, the reduction in diameter is carried out alone in a first phase. After this first phase has been concluded, the can edge of reduced diameter and, as a rule, bent radially inwards slightly, then engages with the flanging region. The second phase, in which the can edge is flanged towards the closing body as a result of further axial displacement, then starts here.

Because the operations of reducing the diameter in the first phase and flanging the can edge in the second phase are separated, the forces acting axially on the can housing are kept relatively low, so that negative upsetting of material or even bulges of the can wall are prevented. The axial movement is advantageously executed by means of an upper die, while the can-type housing is supported so as to be stationary in a holding die. In this method of production by means of a stationary lower holding die for the can-type housing, the preceding operations, such as dry rewidening, insertion of the electrical component with subsequent insertion of the closing body, and the like, can be carried out in one plane, for example on a circular table.

The device itself is equipped, as regards the essential means of operation, with an outer tool effecting the reduction in diameter and an inner tool serving for flanging. In spite of this differentiation between them, the outer tool can be connected rigidly to the inner tool. However, a relative axial displacement of the two tools in relation to one another is advantageously taken into account in terms of construction, so that an ejector function performed by the inner tool after the flanging of the can edge or a time shift between the machining phases 1 and 2 are possible. The axial position of the inner tool relative to the inner edge of the sloping surface of the outer tool therefore determines the start of flanging, and the two machining phases can thereby be regulated so as to overlap one another or to be separated from one another in time to a greater extent.

The flanging region has a wedge-shaped bending surface which preferably has a curvature or a partial arc extending through an angle of approximately 90°. The exact configuration of the bend shape of the flanging region depends on the material thickness of the can-type housing, allowing for a plastic coating which may be present on the outside of the can-type housing, or on the desired size of the radial distance between the can wall and the engagement of the can edge with the elastic closing body. It has been found that the bend shape can be virtually circular with an arc segment from 0° to 90°. The angle of the flanging region is very small and can even approach zero, so that the can edge of reduced diameter is pushed approximately parallel into the flanging region. A segment-like curvature from 0° to 90°, in which the radially inner edge ends virtually horizontally, is usually sufficient to ensure complete deflection of the can edge through approximately 180°. This curvature is preserved because of the rigidity and firmness of the initially bent can region, so that the can material subsequently pushed forward axially and likewise bent results in a flanging of the entire can edge up to 180°.

Both the tool diameters and the curvature of the flanging region depend on the characteristics of the machined can-type housings, and, for example, the diameter of the can-type housing, the material used and the material thickness, etc. have to be taken into account.

The relative axial displacement of the inner tool in relation to the outer tool can advantageously be achieved by ensuring that the inner tool can be subjected to force in both axial directions. To facilitate the guiding and sliding properties of the outer shell of the inner tool on the inner shell of the outer tool, there is appropriately provided, between the two, a sliding gap in which, for example, an oil compatible with an electrolyte, such as, for example, glycerol, can be used as a lubricant. However, it is possible to use this lubricant in the can-type housings used especially for electrical components, only if the can wall is sealed off from the usually elastic closing body immediately in the first phase, namely the reduction in diameter. As a result, the lubricant is prevented from penetrating into the can-type housing. In addition, however, this use of a lubricant improves the axial displaceability of the reduced can-type housing relative to the flanging region and the axial ejection of the flanged can by means of the inner tool. Advantageously, in the flanging phase of the can edge, the inner tool is in axial blocking engagement with the device as a whole, so that a rigid force-conducting path exists during the flanging phase. Insofar as it is necessary, for example because of the material thickness of the can-type housing, the bending surface of the flanging region can also be provided over a greater angular extent, for example 130° or more.

Altogether, the invention makes it possible, in comparison with the state of the art, to achieve a fault-free cycle of automatic feeding of can-type housings to a station which carries out closing and flanging. At the same time, greater reliability as regards closing is achieved, whilst ensuring a lower reject rate, as a result of the non-positive connections which act contrary to the closing technique existing hitherto. Moreover, these criteria are achieved in machining stations which are more compact, faster and therefore more favorable in terms of cost. Consequently, within the scope of the inventive complex, the can-type housing, the process and the device have an inventive character as individual subjects.

THE DRAWINGS

The invention is described in more detail below with reference to diagrammatic drawings showing essentially one exemplary embodiment. In the drawings.

DETAILED DESCRIPTION

Figure 1:
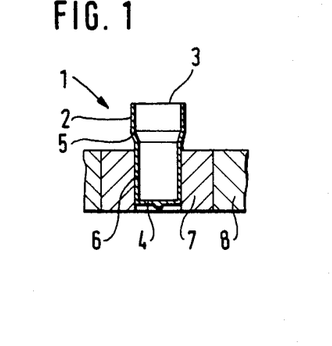
FIG. 1 shows an axial section through a can-type housing with an initial housing widening, which is guide in a transport device indicated in a fragmentary fashion.

FIG. 1 shows a can-type housing 1 in axial section. The can-type housing 1, which is also designated as a rimmed can, conventionally consists of aluminum and has an essentially cylindrical form. In the exemplary embodiment, the lower can region 6 rests in a holding die 7 which has a complementary orifice for the insertion or automatic feeding of the can. The holding die 7, which is arranged in the example as an insert, for example in a circular table 8 or in an automatic production line, positively holds the lower can region of smaller diameter. Although not shown in FIGS. 1 and 2, the can bottom 4 can be supported in the holding die 7 against a limiting ram projecting upwards from below or a stop surface.

The axially upper region of the can-type housing 1 has a housing widening 2 with a larger diameter than the lower region 6 of the can. The region of the housing widening 2 likewise normally has a cylindrical form and merges downwards, in a bevel 5 tapering frustoconically, into the lower can region 6. In the example according to FIG. 1, the can-type housing 1 has a closed circular can edge 3. Other can forms can have, for example, segment portions over an angle of 90°, these being at a uniform distance from one another. This can-type can also be machined without difficulty in the following device.

It is essential for automatic feeding of a can-type housing 1 of this type, with arrangement in the correct position in the holding die 7, that the inside diameter of the housing widening 2 at the upper can edge 3 should be slightly less than the outside diameter in the region 6 located at the bottom.

As a result of this correlation of diameters, the stacking of can-type housings in one another, which normally occurs when the can-type housings are supplied in quantities befitting a mass-produced article, is prevented. The can-type housings 1 are therefore arranged individually when supplied and can consequently be fed by automatic feed devices, for example a vibrating drum, in the correct position to the first processing station. A small cylindrical elevation, which can be used for centering of the can-type housing and providing it with a pole is conventionally provided in the longitudinal axis on the outer surface of the bottom 4 of the can-type housing.

Figure 2:
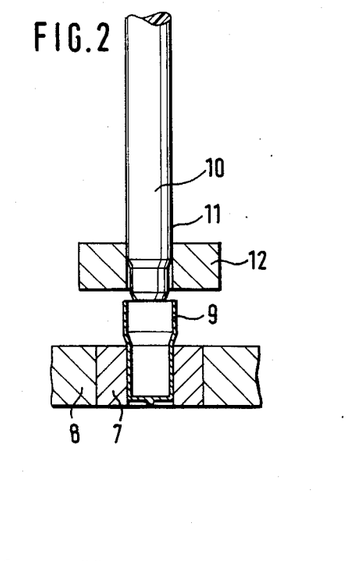
FIG. 2 shows an axial section through a device for carrying out dry rewidening of the can-type housing.

There is a separation in the diagrammatic representation between FIGS. 1 and 2, but this simply identifies the distance between the machining stations, for example in the case of a circular table 8. FIG. 2 shows diagrammatically the dry rewidening of the can-type housing 1. The can-type housing 1 is arranged in the holding die 7 so that the bevel 5 widening upwards starts, as seen axially, at least somewhat above the upper limiting surface of the holding die 7. FIG. 2 does not show how the can-type housing 1 is supported at the bottom. In axial alignment with the can-type housing 1 open towards the top, a ram 10 is lowered into the can orifice from above. This ram 10 is preferably made of relatively hard plastic. The lower region of this ram 10 has an outer shape which is made complementary to the desired dimensions of the diameter of the rewidened secondary housing widening 9. The ram 10 is guided by means of its stem 11 in an upper part 12 which can also serve, at the same time, as a holding-down device against the can edge 3 when the ram is retracted. The ram 10 preferably consists of a plastic which can easily be machine-tooled, since it has been found that the frictional forces between the metal of the can-type housing and the rewidening ram can be maintained in favorable relationships. This dry rewidening therefore requires no cleaning and drying steps of any kind, so that the production cycle is not impaired as a result. Rewidening is also carried out to ensure that a closing body or closing plug of larger diameter can be inserted in a subsequent process step, as a result of which higher compression forces and more reliable closing are achieved in the end.

Figure 3:
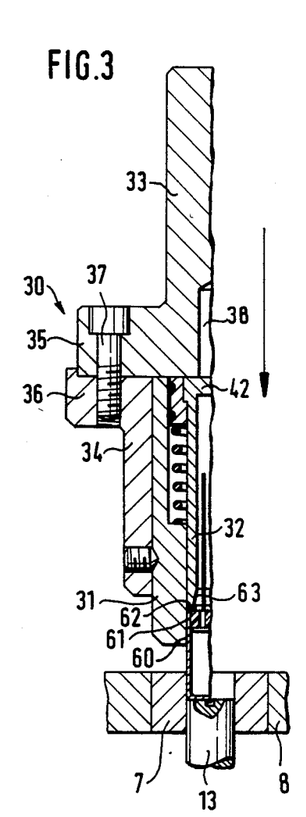
FIG. 3 shows an axial section through a device, designed symmetrically in relation to the vertical axis, for reducing the diameter of and flanging the can edge, FIG. 3 illustrating the flanging phase with the device being lowered.
Figure 4:
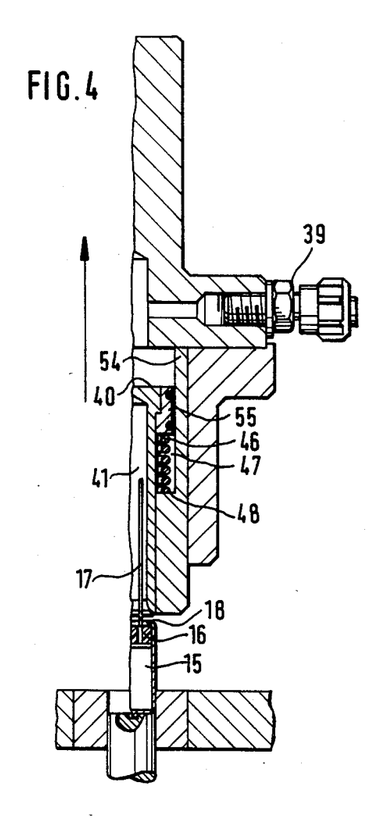
FIG. 4 shows, in axial section, the axially symmetrical right-hand half of the device after the ejection of the flanged can-type housing according to FIG. 3.

For reasons of simplification, FIGS. 3 and 4 illustrate respectively only the axially symmetrical left-hand and right-hand halves of a device for reducing the diameter of and flanging a can-type housing 1 provided with a housing widening. For the sake of clearer illustration, the device is also drawn apart horizontally, whereas, in practice, the axially symmetrical halves shown in FIGS. 3 and 4 represent a single device which, in the example, can be raised and lowered in a vertical direction.

In the exemplary embodiment, the device is formed by an upper die 30 which is conventionally arranged so as to be stationary horizontally, but movable vertically, for example above a circular table 8. The can 15 which is already closed in the example according to FIGS. 3 and 4 is supported at the bottom by a cylindrical supporting ram engaging in the holding die 7. This supporting ram 13 can be vertically movable, so that the axial distance between the upper can edge and the surface of the circular table is adjustable. The upper die 30 consists essentially of an upper headpiece part 33 which has a wider flange 35 in its lower part. A lower part 34 of the die is fastened via this flange 35, by means of a screw connection 37, to a flange 36 resting flush against the headpiece part 33. The lower part 34 has a relatively large axially continuous inner bore, in which, looking radially inwards, there is first an outer tool 31 of sleeve-like design, which an inner tool 32 adjoins in the radial direction.

In the example, the outer tool 31 is supported axially at the top against the flange 35 of the headpiece part 33 by means of an intermediate bush 54 of lesser wall thickness. In addition, the outer tool 31 is fastened in a radial direction, for example by means of set screws, to the sleeve-shaped region of the lower part 34 of the die 30. The outer tool 31 projects beyond the lower edge of the lower part 34, so that when the upper die 30 is lowered completely onto the circular table the lower edge of the outer tool 31 would come to rest against the holding die 7 or the circular table 8.

Since the sleeve-shaped outer tool 31 fastened in the lower part 34 has a greater wall thickness than the intermediate bush 54 serving as a support at the top, a free, approximately cylindrical annular space 47 is formed in the axial direction between the upper edge of the outer tool 31 and the flange underside of the headpiece part of the die 30.

An inner tool 32, approximately in the form of a bush in axial section, is in sliding contact with the inner cylindrical surface 61 of the outer tool 31. The axial extent of this inner tool 32 is kept somewhat greater than the axial length of the lower part 34, so that the inner tool 32, in its normal position, rests by means of its upper end face 40 at least annularly against the underside of the flange 35 of the headpiece part 33 and is supported against it. By normal position is meant, here, the highest possible position of the inner tool 32, upwards in the vertical direction, in which flanging of the can edge takes place.

The inner tool 32 is of substantially bush-like design, and an inner bore 41 is made in it, which is open towards the bottom and is designed as a blind hole and thus leaves in the upper region a closed supporting wall 42 which projects radially slightly beyond the outer cylindrical surface of the inner tool 32 in the manner of a flange. Engaged positively with the flange-like projection of the supporting wall 42 is a sliding sealing ring 55 which seals off radially outwards on the inner wall of the intermediate bush 54 and is vertically displaceable on this. Supported on the lower annular surface of the sliding sealing ring 55 is a helical spring, the other lower supporting surface of which is the radially inner, but upward-pointing annular surface of the outer tool 31. The helical spring 46 is therefore located within the cylindrical annular space 47. This cylindrical annular space 47 can be used as a reservoir for a lubricant, for example glycerol, which can penetrate in the manner of a sliding film into the sliding gap 49, adjoining this annular space at the bottom between the cylindrical surfaces of the outer tool 31 and of the inner tool 32.

Figure 6:
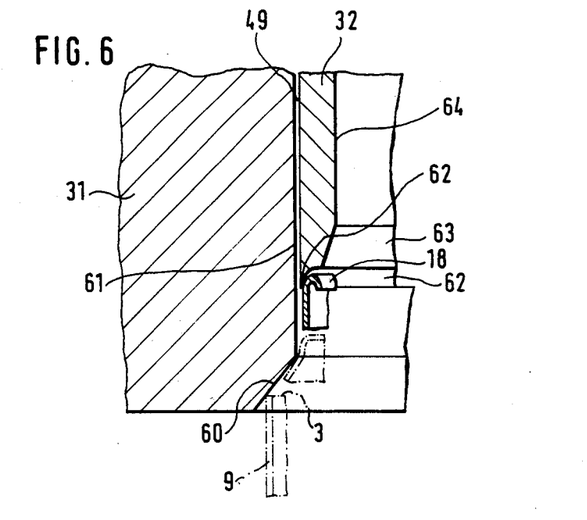
FIG. 6 shows an enlarged cut-off VI according to FIG. 5 with different phases of the reduction in diameter and flanging of the can edge.

With reference, at the same time, to the enlarged representation in FIG. 6, the outer tool 31 has, starting from its lower annular surface, an engagement surface 60 tapering inwards towards the axis in the form of a wedge. Depending on the material used for the can-type housing, this engagement surface 60 can preferably form an angle of inclination relative to the horizontal which is greater than 45°, for example between 50° and 80°. The lower edge of this engagement surface 60 has a diameter which in all cases is greater than the largest possible outside diameter, coming within the tolerance range, of the secondary housing widening 9 of the can-type housing 1. This ensures that, when the upper die 30 is lowered towards the can projecting upwards from the die and already provided with the closing body 16, the upper can edge 3 reliably comes to rest against the engagement surface 60 and, during further axial displacement, can be bent according to the line of inclination of the engagement surface.

The smallest diameter, located somewhat further inwards in an axial direction, of this wedge-shaped engagement surface 60 which, in section, preferably forms a straight line corresponds to the desired value of the outside diameter of the closed can 15 of reduced diameter.

Adjacent to the inner edge of the engagement surface 60 of the outer tool 31 and offset axially by a certain distance inwards is the lowest tip of the inner tool 32. This lowest region of the inner tool 32 is formed as a bending region 62 and extends approximately semi-arcuately with a very small radius through an angle of approximately 90°. The lowest region of this bending region 62 extends virtually parallel to the inner cylindrical surface 61 of the outer tool 31. This bending region 62 is adjoined radially and axially inwards by a likewise wedge-shaped deflection surface 63 which merges into the cylindrical inner shell surface 64 obtained as a result of the internal bore. To ensure that the inner tool 32 is axially displaceable relative to the outer tool 31 fixed in the die, there is between the two tools a sliding gap 49 which is shown enlarged in FIG. 6 for the sake of greater clarity.

As shown in FIG. 4, a connection 39 for a pressure medium is attached in a known way to the headpiece part 33. This connection is joined, via a connecting channel running first horizontally through the flange 35, to a pressure space 38 extending coaxially to the vertical axis. The diameter of the cylindrical pressure space 38 at the lower edge of the flange 35 is such that this pressure space 38 is closed off in an essentially sealing fashion by the supporting wall 42 of the inner tool 32 in the normal position of the latter.

With reference to FIGS. 3 to 6, closing and flanging are carried out in two successive phases by means of the upper die 30. The can provided with the inserted electrical component and with the closing plug 16 inserted into the secondary housing widening 9 is, in the machining station, in vertical axial alignment with the center axis of the upper die 30. This die 30 is fastened in a known way to a stationary frame stand and is movable vertically on this. In the normal position of the inner tool 32, as shown in the left-hand half of FIG. 5 and in FIG. 3, the upper die 30 is lowered mechanically or hydraulically, so that the wedge-shaped engagement surface 60 engages with the upper can edge 3. As a result of further lowering of the die 30, a bending force having a force component directed radially and axially downwards is exerted on the fixed can in the region of the housing widening 9. This ensures that the material of the closing plug 16, which consists at least partially of an elastomer, is compressed radially, but a compression component directed into the can-type housing occurs in addition.

The upper die 30 is lowered down until the secondary housing widening is reduced to the desired outside diameter. Lowering is therefore preferably effected over a distance determined by the spacing between the upper can edge and the bending point or point of transition of the bevel into the unwidened can edge. The can edge of reduced diameter and bent slightly inwards therefore engages with the bending region 62 of the inner tool 32 only after the reduction in diameter has been concluded. Because the reduction in diameter and the subsequent flanging of the can edge are separated into two phases, the forces acting axially on the can are kept to a minimum. The transitions on the tools, which are shown relatively sharp-edged for reasons of simplification, are preferably rounded so as to allow the engagement surfaces to slide more smoothly relative to one another and to leave undamaged a possible outer plastic coating present on the can.

Because the can edge is slightly bent radially inwards in a predetermined way as a result of the reduction in diameter, it enters the curvature of the bending region 62 when the upper die 30 as a whole is lowered further. It is sufficient, here, for the curvature to extend only through an angle of approximately 90°, since the curvature of the material of the can edge is preserved as a result of the rigidity of the material and is increased further, with an approximately constant radius of curvature, as a result of the axial displacement. This second phase of flanging and lowering the upper die 30 as a whole takes place until the can edge 8, now pointing radially inwards and at least slightly axially downwards, engages against the closing plug in the desired manner.

The function of the deflection surface 63 adjoining the bending region 62 is to deflect the lead wires 17, which protrude through the closing plug, into the axially relatively long internal bore 41 of the inner tool 32. As a result, twisting or entanglement of these lead wires 17 or even damage to the soldered joints are prevented.

Figure 5:
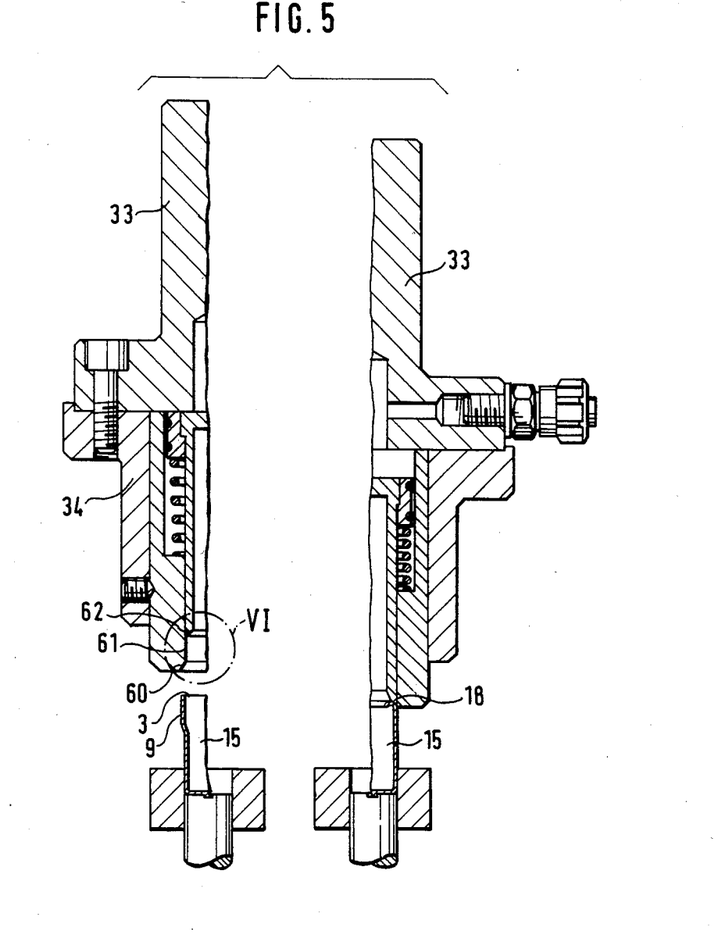
FIG. 5 shows an axial section through a device according to FIGS. 3 and 4, the left-hand half of FIG. 5 illustrating the operating phase before the device is lowered and the right-hand half of FIG. 5 showing the operating phase during the ejection of the flanged can-type housing.

As a result of the lubricant which is present in the sliding gap 49 and which also passes onto the lower inner cylindrical surface 61 of the outer tool, the frictional forces between the can wall and the upper die 30 are kept relatively low. To eject the flanged can 15, the upper die 30 is moved slowly upwards. In the phase of reversal of the axial direction of movement of the upper die 30, pressure medium is introduced into the pressure chamber 38 through the connection 39. This is preferably compressed air. The force is exerted by means of the pressure medium at the rear of the supporting wall 42 of the inner tool 32 during the time when the upper die 30 as a whole is raised, so that the vertical position of the inner tool 32 relative to the circular table 8 remains virtually unchanged. However, during the combined exertion of pressure and retraction of the upper die 30, the helical spring 46 between the sliding sealing ring 55 and the upper annular surface 48 of the outer tool 31 is shortened axially and compressed. The bending region 62 of the inner tool 32 is preferably moved down until this bending region projects slightly beyond the horizontal plane of the lower edge of the outer tool 31. As a result of this relative movement of the inner tool 32 in relation to the outer tool 31, the flanged can 15 is ejected from the upper die. At the same time, the can can remain completely stationary in its holding die 7.

By raising the lower supporting ram 13 or by means of an automatic gripping device (not shown), the flanged can 15 of reduced diameter can now be removed from the holding die 7. Another possibility is first to move the upper die as a whole vertically upwards for a corresponding distance, the can being carried upwards as a result of a light bearing fit against the inner cylindrical surface of the outer tool, and subsequently to eject the flanged and closed can into an available receiving container by lowering the inner tool.

To eject the flanged can-type housing, the upper die as a whole is preferably first moved upwards, and only then is pressure exerted on the inner tool, the pressure medium also spreading downwards into the space formed by the inner wall of the intermediate bush 54. After the can has been ejected, the inner tool 32 is retracted by relieving the pressure space 38 of pressure and then, as a result of the spring force generated by the spring 46, retracting the inner tool 32 until it comes to rest against the lower surface of the flange 35. Compressed air, for example at 6 bars, is preferably used the pressure medium, and after the relief of pressure a partial vacuum can be generated conventionally in the "pressure space".

I claim:

1. A process for closing a can-type metal housing over an eleastic closure means for encasing an electrical component or the like, said can-type housing having a housing side wall with an enlarged diameter widening in the region of an open axial end, said housing side wall merging into the opposite axial end of the enlarged diameter widening by means of a beveled region inclined relative to the housing axis, comprising the steps for inserting the electric component into the can-type housing, inserting the closure means into the housing widening in the region of the open axial end, and plastically deforming and reducing the diameter of the housing widening axially from the open axial end towards the opposite axial end by means of a force component direction radially inwards and axially against said elastic closure means to radially compress said closure means within the deformed end portion of said housing side wall.

2. A process for closing a can-type metal housing over an elastic closure means for encasing an electrical component or the like, said can-type housing having a housing side wall with an enlarged diameter widening in the region of an open axial end having an upper edge, said housing side wall merging into the opposite axial end of the enlarged diameter widening by means of a beveled region inclined relative to the housing axis, comprising the steps for inserting the electrical component into the can-type housing, inserting the closure means into the housing widening in the region of the open axial end, progressively plastically deforming and reducing the diameter of the housing widening axially from the upper edge towards the opposite axial end by means of a force component directed radially inwards and axially against said elastic closure means to radially compress said closure means within the deformed end portion of said housing side wall, and shaping the upper edge as an inward flange.

3. A process for closing a can-type metal housing over an elastic closure means for encasing an electrical component or the like, said can-type housing having a housing side wall with an enlarged diameter widening in the region of an open axial end having an upper edge, said housing side wall merging into the opposite axial end of the enlarged diameter widening by means of a beveled region inclined relative to the housing axis, comprising the steps for inserting the electrical component into the can-type housing, inserting the closure means into the housing widening in the region of the open axial end, plastically deforming and reducing the diameter of the housing widening axially from the upper edge towards the opposite axial end to the diameter of the unwidened region at the opposite axial end by means of a force component directed radially inwards and axially against said elastic closure means provided by a die having an approximately frusto-conical reduction in diameter, to radially compress said closure means within the deformed end portion of said housing side wall, and shaping the upper edge as an inward flange, wherein the reduction in diameter and the flanging of the upper edge are carried out by means of axial displacement of the housing relative to the die.

* * * * *

UNITED STATES PATENT AND TRADEMARK OFFICE
CERTIFICATE OF CORRECTION

PATENT NO.  : 4,580,328
DATED       : April 8, 1986
INVENTOR(S) : Rudolf Klaschka It is certified that error appears in the above-identified patent and that said Letters Patent is hereby corrected as shown below:

Column 1 Line 13 "wisely" should read --widely--.

Column 6 Line 65 "guide" should read --guided--.

In the Claims:

Claim 1  Column 12 Line 8 "electric" should read --electrical--.

Claim 1  Column 12 Line 15 "direction" should read --directed--.

Signed and Sealed this

Seventeenth Day of June 1986

[SEAL]

Attest:

DONALD J. QUIGG

Attesting Officer

Commissioner of Patents and Trademarks